United States Patent
Parry

(10) Patent No.: US 7,451,442 B2
(45) Date of Patent: Nov. 11, 2008

(54) SYSTEM AND METHOD FOR INSTALLING A TRANSLATOR

(75) Inventor: Travis J. Parry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 643 days.

(21) Appl. No.: 10/283,451

(22) Filed: Oct. 30, 2002

(65) Prior Publication Data

US 2003/0051046 A1  Mar. 13, 2003

Related U.S. Application Data

(63) Continuation-in-part of application No. 09/954,832, filed on Sep. 12, 2001.

(51) Int. Cl.
*G06F 9/445* (2006.01)

(52) U.S. Cl. ............... 717/176; 717/175; 709/203; 709/217; 358/1.13; 358/1.15

(58) Field of Classification Search ............ 717/101, 717/176; 719/321, 231; 705/52; 713/2; 358/1.15
See application file for complete search history.

(56) References Cited

U.S. PATENT DOCUMENTS

| | | | |
|---|---|---|---|
| 6,714,964 B1* | 3/2004 | Stewart et al. | 709/203 |
| 6,892,299 B2* | 5/2005 | Abe | 713/2 |
| 6,915,337 B1* | 7/2005 | Motoyama et al. | 709/220 |
| 6,947,995 B2* | 9/2005 | Chang et al. | 709/231 |
| 6,954,278 B1* | 10/2005 | Cronch et al. | 358/1.15 |
| 6,959,437 B2* | 10/2005 | Schacht et al. | 719/321 |
| 7,187,459 B2* | 3/2007 | Chiba et al. | 358/1.13 |
| 2002/0051200 A1* | 5/2002 | Chang et al. | 358/1.15 |
| 2002/0055984 A1* | 5/2002 | Chang et al. | 709/217 |
| 2002/0065873 A1* | 5/2002 | Ishizuka | 709/203 |
| 2002/0077986 A1* | 6/2002 | Kobata et al. | 705/52 |
| 2002/0138564 A1* | 9/2002 | Treptow et al. | 709/203 |
| 2003/0041269 A1* | 2/2003 | Kurishita et al. | 713/201 |
| 2003/0131149 A1* | 7/2003 | Sugiura | 709/321 |

OTHER PUBLICATIONS

Axis Communications, White Paper, "Mobile Printing—Today and in the Future", Mar. 2001 (10 pages).*

* cited by examiner

*Primary Examiner*—Tuan Q. Dam
*Assistant Examiner*—Thuy Dao

(57) ABSTRACT

A system and a method pertain to packaging a document file together with a translator to form a job package, opening the job package, identifying the translator, and installing the translator in memory of an imaging device.

30 Claims, 7 Drawing Sheets

SYSTEM AND METHOD FOR INSTALLING A TRANSLATOR

CROSS-REFERENCE TO RELATED APPLICATION

This application is a continuation-in-part (CIP) of and claims the benefit of the filing date of U.S. patent application Ser. No. 09/954,832, filed Sep. 12, 2001, which is hereby incorporated by reference in its entirety into the present disclosure.

FIELD OF THE DISCLOSURE

The present disclosure relates to file translation. More particularly, the disclosure relates to a system and method with which a translator can be installed.

BACKGROUND

Device drivers are normally used by computing devices (e.g., personal computers (PCs)) to communicate with other devices. For example, printer drivers are typically needed to send jobs from a user application (e.g., word processing application) executing on the computing device to a printer. Generally speaking, drivers comprise software programs that control the device that is to be utilized. The driver acts as a translator between the end device and applications that use the device in that each device has its own specialized language that it speaks. Drivers therefore are adapted to accept generic commands from an application and translate the generic commands into specialized commands for the end device.

Device drivers are usually provided to the user upon purchase of a particular device. Alternatively or in addition, a driver for a recently acquired device can be downloaded from the Internet. In that each driver is specifically adapted for a particular device, the user normally must install on his or her computer a different driver for each device that the user intends to access. Moreover, to obtain optimal performance, the user may need to periodically update the drivers as improved versions are developed by the device manufacturer.

Recently, some imaging device manufacturers have developed so-called "driverless" systems in which the user need not manually install a driver on his or her computer to access and use a given device. In one such arrangement, a print server is used that stores all drivers for all devices connected to a network. In this arrangement, jobs are sent to the print server which acts as a translator for the device that is to execute the job. In another arrangement, each device stores its associated driver on internal memory.

While providing an improvement over more conventional systems, driverless systems do not solve other problems. Aside from security issues discussed in U.S. patent application Ser. No. 09/954,832, the user or system administrator must still install the appropriate translators. For example, if an imaging device does not already comprise the translator needed for a particular print job, this translator must somehow be installed on the print server or the device. Additionally, from time to time it will be desirable to update one or more of these translators as new versions are made available.

From the foregoing, it can be appreciated that it would be desirable to have a system and method for facilitating installation of translators.

SUMMARY OF THE DISCLOSURE

Disclosed are systems and methods for installing translators. In one embodiment, a system and a method pertain to packaging a document file together with a translator to form a job package, opening the job package, identifying the translator, and installing the translator in memory of an imaging device.

BRIEF DESCRIPTION OF THE DRAWINGS

The disclosed systems and methods can be better understood with reference to the following drawings. The components in the drawings are not necessarily to scale.

DETAILED DESCRIPTION

As described above, needed are systems and methods with which translators can be installed in driverless systems, i.e., systems in which driver software for a given file type is not stored on the user's computing device but is instead installed on another device. More particularly, needed are systems and methods with which translators can be installed on one or more imaging devices that the user intends to access. As described in the following, a translator can be installed on a given imaging device by including the translator in a print job delivered to the imaging device. Upon receipt of the print job, the imaging device can store and install the translator both for the purpose of translating the received print job as well as future print jobs of the same file type.

Disclosed herein are systems and methods that facilitate translator installation on imaging devices. To facilitate description of the systems and methods, example systems are first discussed with reference to the figures. Although the systems are described in detail, these systems are provided for purposes of illustration only and various modifications are feasible. After the description of the example systems, examples of operation of the systems are provided to explain the manners in which translators can be installed.

Figure 1:
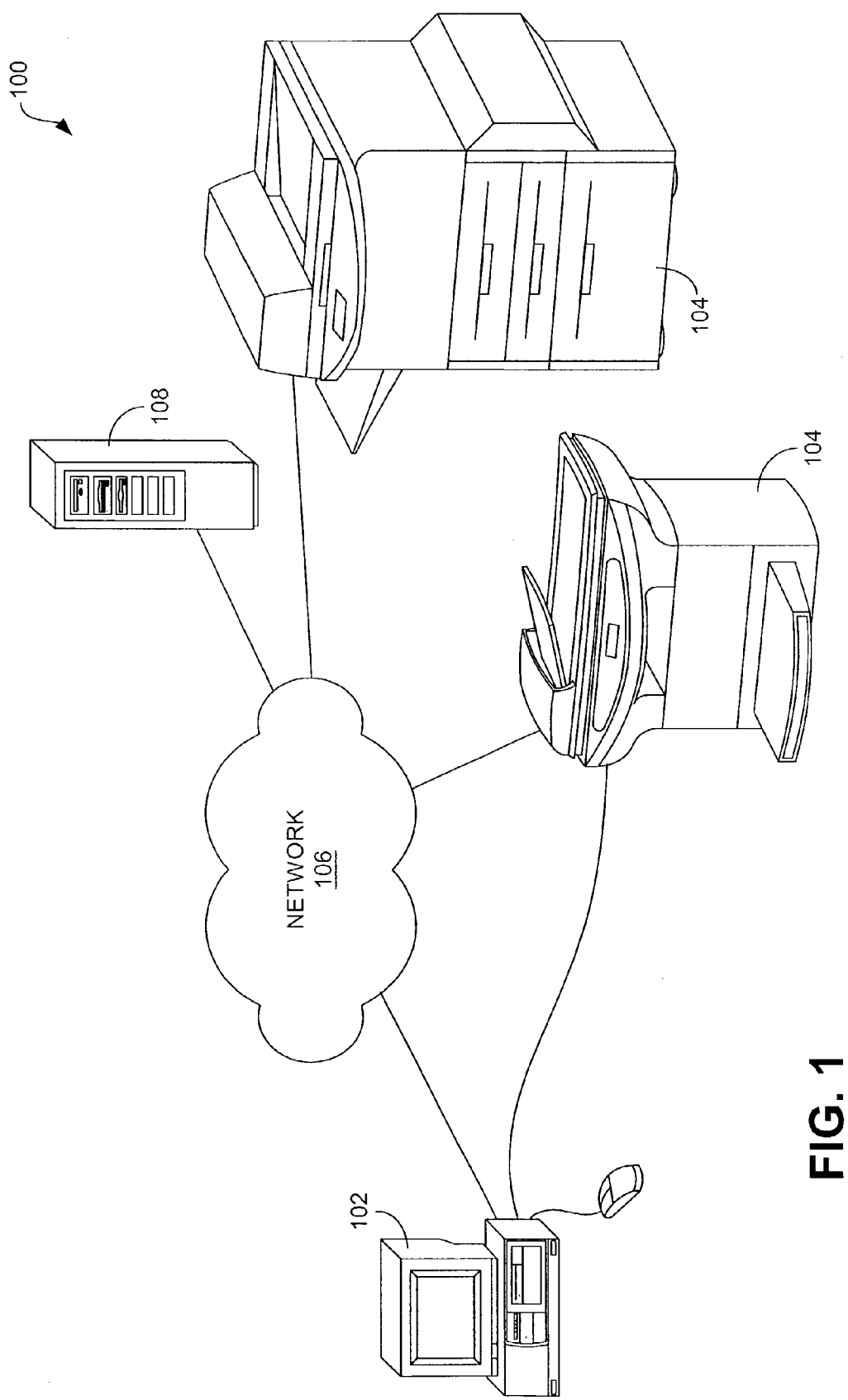
FIG. 1 is a schematic view of an example system that facilitates installation of a translator.

Referring now in more detail to the drawings, in which like numerals indicate corresponding parts throughout the several views, FIG. 1 illustrates an example system 100. As indicated in this figure, the system 100 generally comprises a user computing device 102 and one or more imaging devices 104. The computing device 102 comprises substantially any device that is capable of communicating with an imaging device by transmitting data to and/or receiving data from the imaging device. By way of example, the computing device 102 comprises a personal computer (PC). Although a PC is identified in FIG. 1 and has been identified herein, the computing device 102 could, alternatively, comprise another type of computing device including, for instance, a notebook computer, a personal digital assistant (PDA), a mobile telephone, etc.

The imaging devices 104 comprise substantially any device that is capable of generating hardcopy documents including, for example, printers, photocopiers, facsimile machines, multifunction peripheral (MFP) devices, all-in-one devices, etc. As is discussed in greater detail below, the imaging devices 104 are configured to obtain (e.g., receive) and install translators that are used to translate data in a first format or language into a machine format or language that the imaging device uses.

As is further identified in FIG. 1, the computing device 102 and the imaging devices 104 can, optionally, be connected to a network 106 that typically comprises one or more sub-networks that are communicatively coupled to each other. By way of example, these networks can include one or more local area networks (LANs) and/or wide area networks (WANs). In some embodiments, the network 106 may comprise a set of networks that forms part of the Internet. As is depicted in FIG. 1, the computing device 102 can communicate with one or more of the imaging devices 104 via the network 106 and/or can communicate with one or more of the imaging devices directly through a direct (wired or wireless) connection.

Also depicted in FIG. 1 is a further computing device 108, which may act as a source for translator software or firmware to be provided to the imaging devices 104. By way of example, the computing device 108 comprises a server computer.

Figure 2:
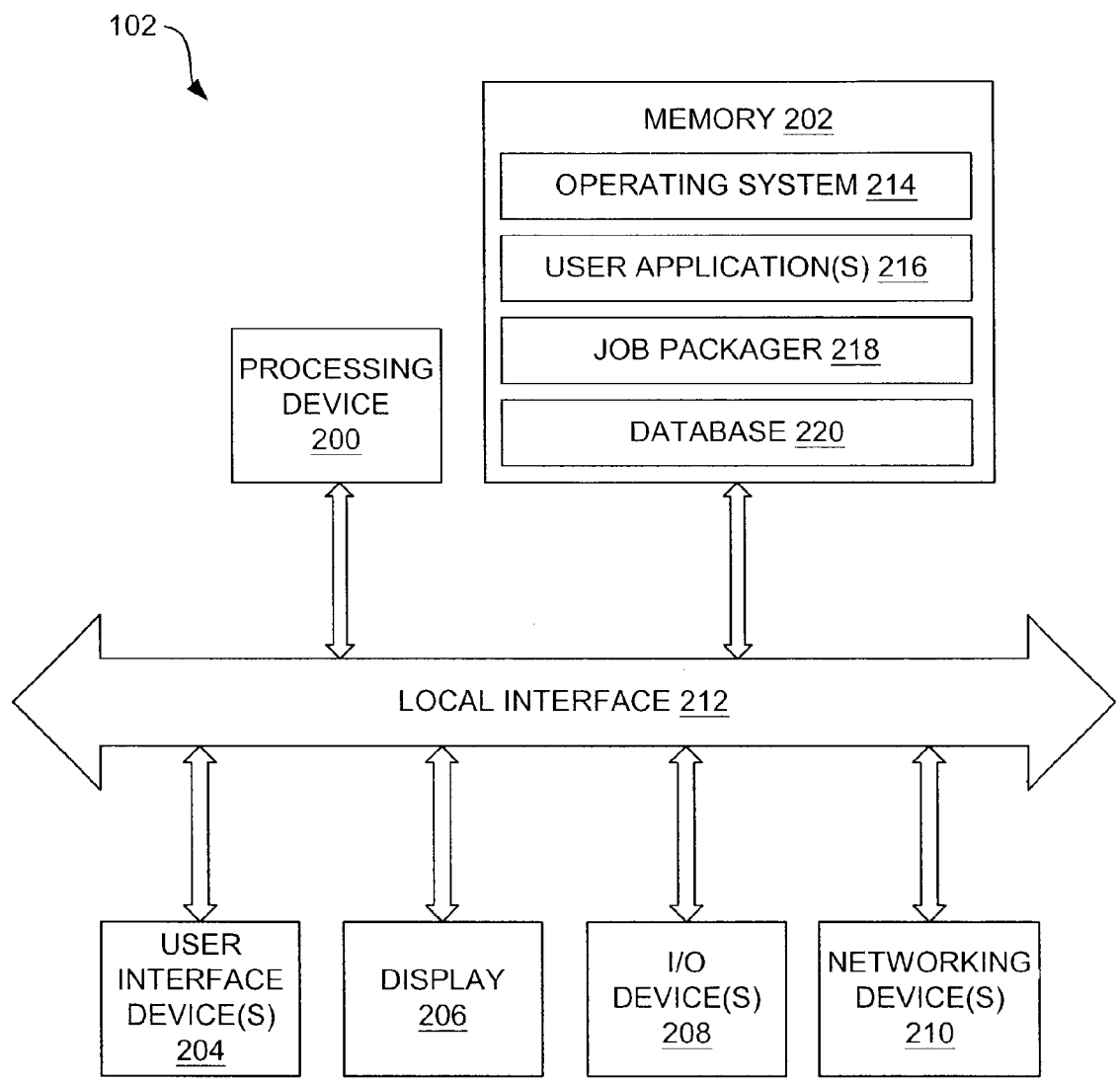
FIG. 2 is a schematic view of a computing device shown in FIG. 1.

FIG. 2 is a schematic view illustrating an example architecture for the user computing device 102 shown in FIG. 1. As indicated in FIG. 2, the computing device 102 comprises a processing device 200, memory 202, one or more user interface devices 204, a display 206, one or more input/output (I/O) devices 208, and one or more networking devices 210, each of which is connected to a local interface 212.

The processing device 200 can include any custom made or commercially available processor, a central processing unit (CPU) or an auxiliary processor among several processors associated with the computing device 102, a semiconductor based microprocessor (in the form of a microchip), or a macroprocessor. The memory 202 includes any one of a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 204 comprise those components with which the user can interact with the computing device 102. For example, where the computing device 102 comprises a PC, these components can comprise a keyboard and mouse. Where the computing device 102 comprises a handheld device (e.g., PDA, mobile telephone), these components can comprise function keys or buttons, a touch-sensitive screen, etc. The display 206 can comprise a cathode ray tube (CRT) or liquid crystal monitor for a PC, or a liquid crystal display (LCD) for a handheld device.

With further reference to FIG. 2, the one or more I/O devices 208 are adapted to facilitate connection of the computing device 102 to another device, such as an imaging device 104, and may therefore include one or more serial, parallel, small computer system interface (SCSI), universal serial bus (USB), IEEE 1394 (e.g., Firewire™), or other communication components. The networking devices 210 comprise the various components used to transmit and/or receive data over the network 106. By way of example, the network interface devices 210 include a device that can communicate both inputs and outputs, for instance, a modulator/demodulator (e.g., modem), wireless (e.g., radio frequency (RF)) transceiver, a telephonic interface, a bridge, a router, network card, etc.

The memory 202 comprises various programs, in software and/or firmware, including an operating system 214, one or more user applications 216, and a job packager 218. The operating system 214 controls the execution of other software and provides scheduling, input-output control, file and data management, memory management, and communication control and related services. The user applications 216 comprise applications that execute on the computing device 102 and from which print jobs can issue. By way of example, the user applications 216 can comprise a word processing application, an image manager, etc. As is discussed in greater detail below, the job packager 218 is configured to bundle a document file with one or more translators that can be used by an imaging device 104 to translate the document files into a language the device understands. In addition to these programs, the memory 202 can include a database 220 that can be used to store various different translators.

Figure 3:
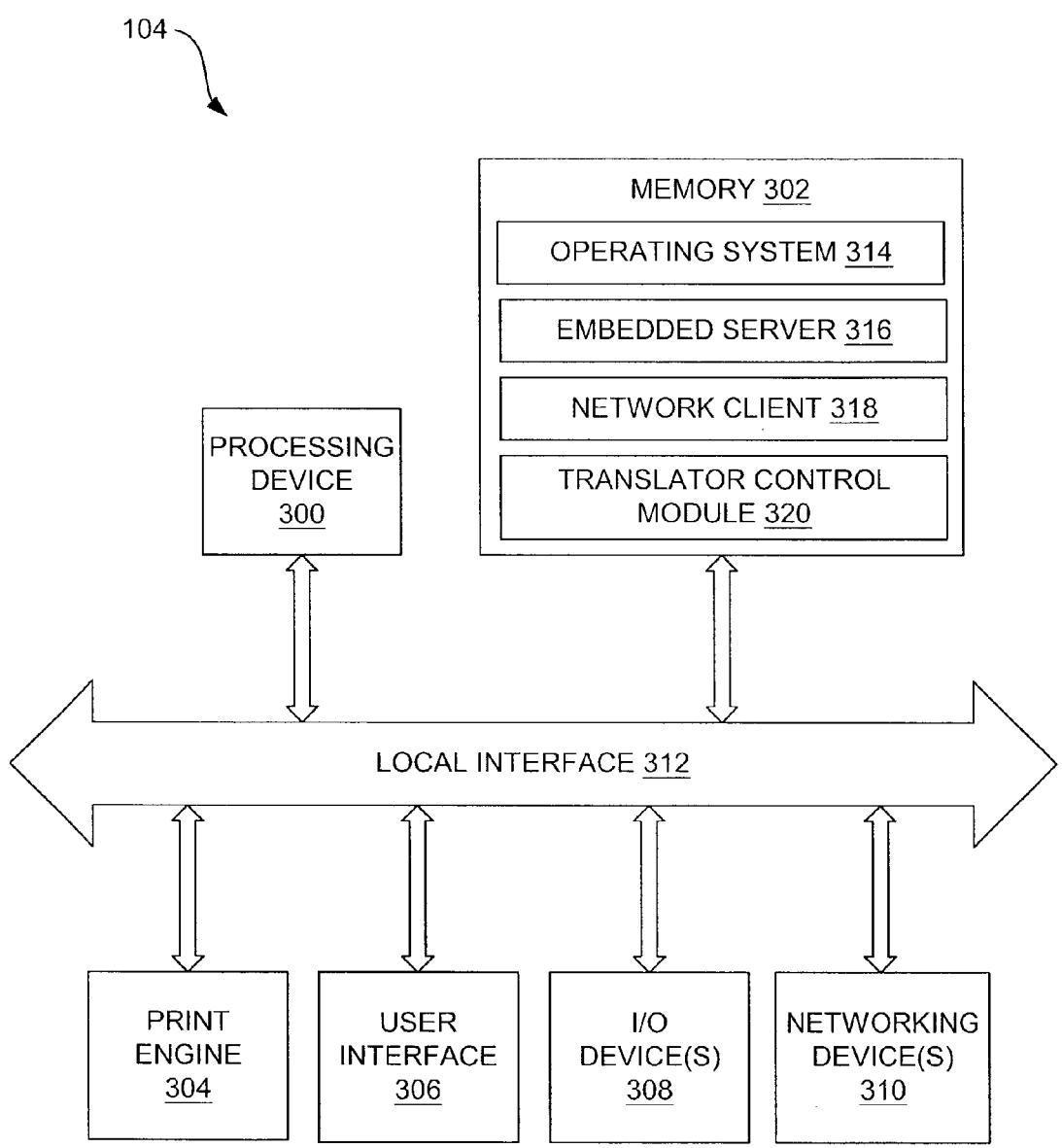
FIG. 3 is a schematic view of an imaging device shown in FIG. 1.

FIG. 3 is a schematic view illustrating an example architecture for the imaging devices 104 shown in FIG. 1. As indicated in FIG. 3, each imaging device 104 can comprise a processing device 300, memory 302, a print engine 304, a user interface 306, one or more I/O devices 308, and one or more networking devices 310. Each of these components is connected to a local interface 312 that, by way of example, comprises one or more internal buses.

The processing device 300 is adapted to execute commands stored in memory 302 and can comprise a general-purpose processor, a microprocessor, one or more application-specific integrated circuits (ASICs), a plurality of suitably configured digital logic gates, and other well known electrical configurations comprised of discrete elements both individually and in various combinations to coordinate the overall operation of the imaging device 104. The memory 302 can include any one or a combination of volatile memory elements (e.g., RAM) and nonvolatile memory elements (e.g., ROM, hard drive, etc.).

The print engine 304 comprises the components with which the imaging device 104 generates hardcopy documents. For example, the print engine 304 may comprise an electrophotographic (EP) print engine (not shown) that includes a photosensitive member, a charging device that forms a uniform electric charge on the photosensitive member, an optical scanner that selectively discharges portions of the photosensitive member to form a latent image on the member, and a developing device that develops the latent image by applying toner to the photosensitive member.

The user interface 306 comprises the tools with which the device settings can be changed and through which the user can communicate commands to the imaging device 104. By way of example, the user interface 306 comprises one or more function keys and/or buttons with which the operation of the imaging device 104 can be controlled, and a display, such as a liquid crystal display (LCD), with which information can be visually communicated to the user and, where the display comprises a touch-sensitive screen, commands can be entered.

The one or more I/O devices 308 and the one or more network interface devices 310 operate and can have similar configuration to the like-named components described above with relation to FIG. 2.

The memory 302 includes various programs, in software and/or firmware, including an operating system 314, an embedded server 316, and a network client 318. The operating system 314 contains the various commands used to control the general operation of the imaging device 104. The embedded server 316 is configured to serve content over the network 106 and therefore provides a means for accessing the imaging device 104. The network client 318 is configured to access various network sources to, for example, retrieve job packages.

The memory 302 further comprises a translator control module 320 that is used to identify, separate (if necessary), store, and install translators. The operation of the translator control module 320 is described in greater detail below in relation to FIG. 6.

Various programs have been described herein. These programs can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

Example systems having been described above, operation of the systems will now be discussed. In the discussions that follow, flow diagrams are provided. Process steps or blocks in these flow diagrams may represent modules, segments, or portions of code that include one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Figure 4:
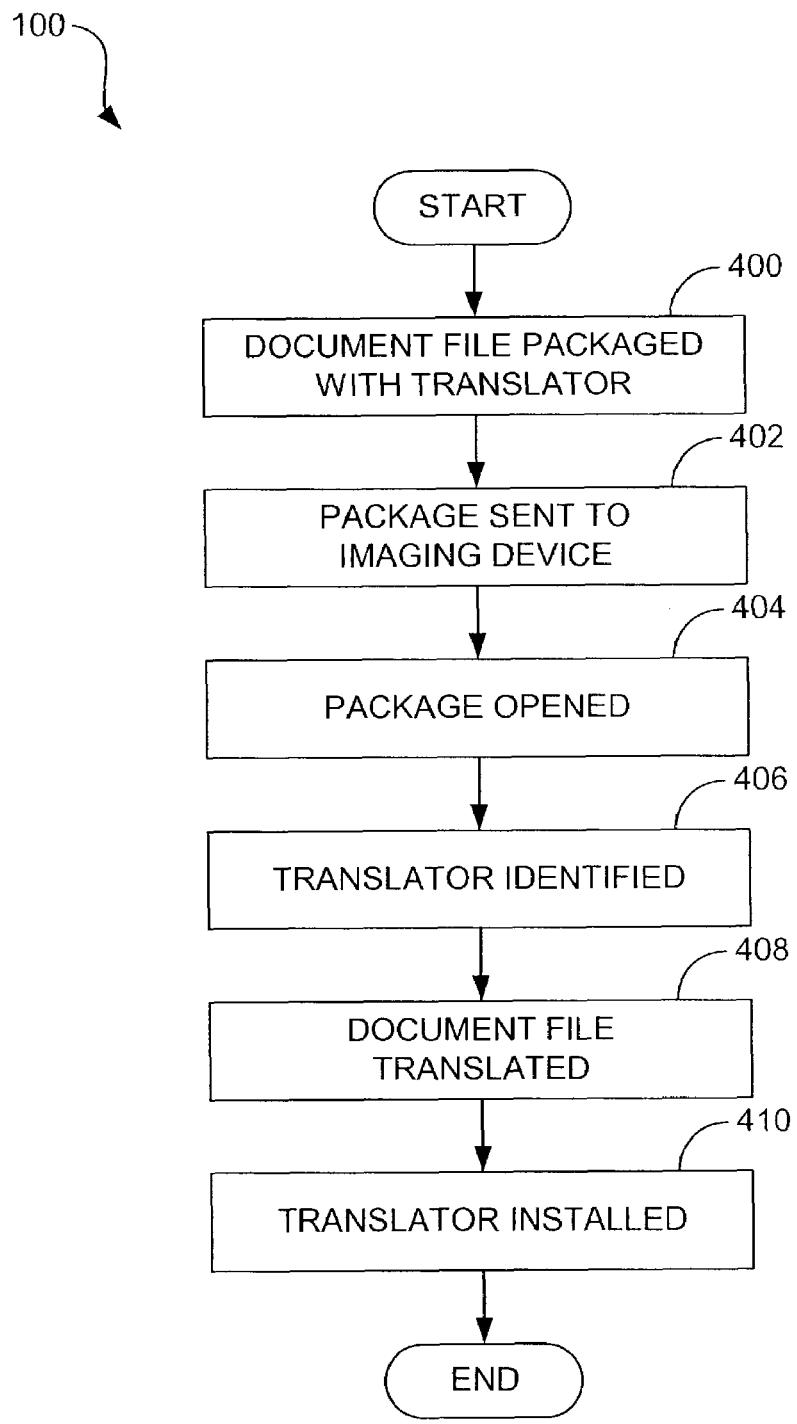
FIG. 4 is a flow diagram that illustrates the operation of the system in FIG. 1 in facilitating translator installation.

Generally speaking, operation of the system involves providing a package including a document file and a translator to an imaging device, and using the translator to translate the document file, as well as later received document files of the same format or language. An example of such a procedure is described with reference to FIG. 4. Beginning with block 400, a document file is packaged with a translator. Next, the package is sent to an imaging device that has been selected to generate a hardcopy of the document, as indicated in block 402.

Once the package is received, it is opened, as indicated in block 404, and the translator is identified, as indicated in block 406. After the translator has been identified, it is separated from the document file and used to translate the document file, as indicated in block 408. At this point, the document file is now represented in machine code used by the imaging device and may therefore be used to generate the hardcopy document. The translator is installed on the imaging device, as indicated in block 410, for future use with document files of the same format or language as the translated file.

Figure 5A:
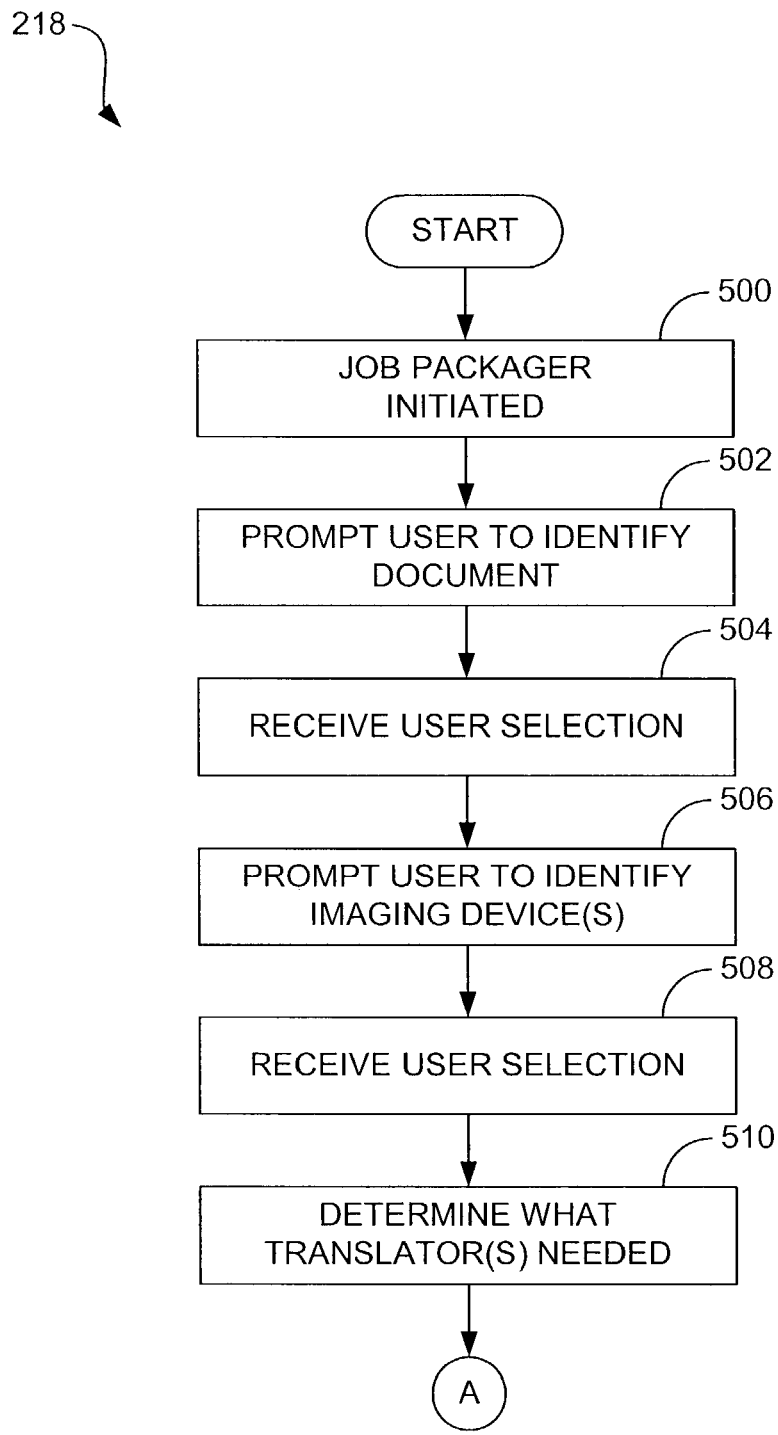
FIGS. 5A and 5B provide a flow diagram that illustrates an example of operation of a job packager shown in FIG. 2.
Figure 5B:
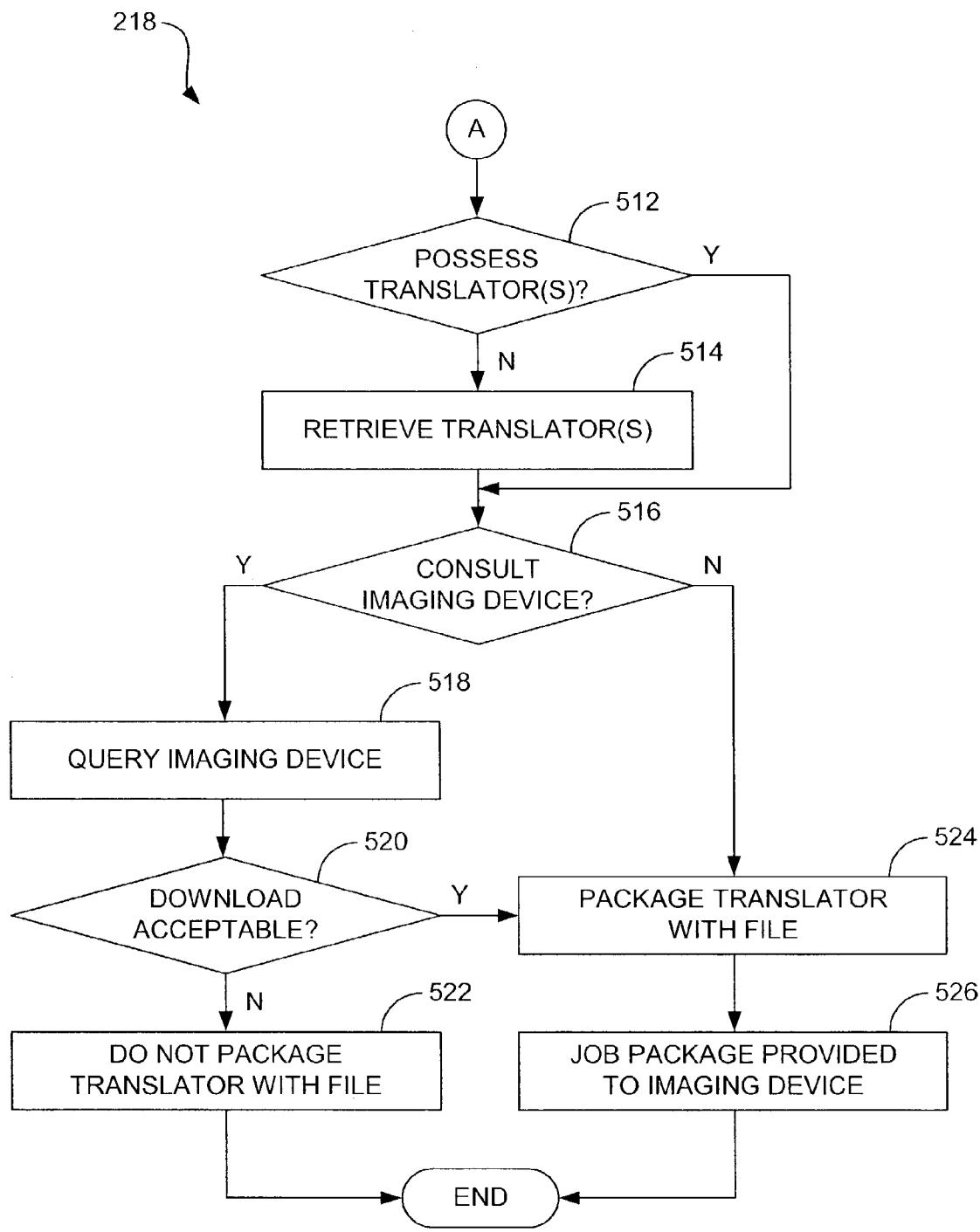

Packaging of document files with translators will now be discussed in greater detail to FIGS. 5A and 5B. Beginning with block 500 of FIG. 5A, the job packager 218 is first initiated. This initiation can occur in several different ways. For example, initiation of the job packager 218 can occur in response to a command selected by a user from one of the user applications 216. In such a scenario, the user may have just completed creating or modifying a document. In another example, initiation can occur separate from the user application by opening a separate application associated with the job packager 218 on the computing device 104. In such a scenario, the user may not have created the document, but still may wish to generate a hardcopy.

Once the job packager 218 has been initiated, it can prompt the user to identify which document file is to be packaged along with a translator, as indicated in block 502. Notably, this step may be skipped where the job packager 218 was initiated directly from the user application 216. Under other circumstances, the selection can be made by the user by browsing through computing device memory 302. For example, the user can be presented with drop-down menus with which the user can browse the files of the computing device hard drive or disk drives in a free format. Once the selection has been made, the selection can be received, as indicated in block 504.

At this point, the job packager 218 can prompt the user to select the imaging device or devices that the user wishes to use, as indicated in block 506. Again, the user can be presented with a drop-down menu to aid in the selection. Once this selection is made, it is received, as indicated in block 508, and the job packager 218 then determines which translator or translators are needed, as indicated in block 510. The translators identified depend upon the imaging devices selected. Where only one imaging device has been selected, a single translator will normally suffice. For the purposes of the following discussion, it is assumed that only one imaging device has been selected and, therefore, only one translator is needed. Specifically needed is a translator that is configured to translate the original document file (e.g., Word file) into the machine language of the specific imaging device that is to be used to generate a hardcopy document. The translator may comprise a translator for a new user application that the imaging device does not yet possess. Alternatively, the translator may be an updated version of a translator already possessed by the imaging device. Accordingly, the presently described process can be used to update the imaging device.

The translator can be obtained from, for instance, the database 220. Alternatively, the translator may be obtained from a separate translator source. Accordingly, with reference to decision block 512 of FIG. 5B, it is determined whether the needed translator is possessed. If so, for instance the pertinent translator is stored in the database 220, flow continues down to decision block 516 described below. If the translator is not possessed, however, flow continues to block 514 at which the translator is retrieved from an appropriate translator source. This translator source can, for instance, comprise the computing device 108. This computing device may comprise, for example, a Web server that hosts a Web site of the manufacturer of the software used to create the document file or a the manufacturer of the selected imaging device.

Once the translator has been retrieved, or if it was already possessed (block 512), flow continues to decision block 516 at which it is determined whether to consult the imaging device prior to providing the translator to the device. This determination may be, for example, dependent upon the setting that has been selected for the job packager 218. If no such consultation is necessary, flow continues down to block 524 described below. If, on the other hand, consultation is required, flow continues to block 518 and the imaging device is queried to ask the device whether provision of the translator is acceptable. With regard to decision block 520, if such provision is acceptable, flow continues again to block 524. If not, for example if the imaging device has been set by an authorized person (e.g., system administrator) not to accept the translator for any reason, flow continues to block 522 and the translator is not packaged with the document file.

If no consultation was necessary (block 516) or if transmission was identified as being acceptable (block 520), flow continues to block 524 at which the translator is packaged with the document file to create a job package that may be provided to the imaging device. Optionally, the package can be manipulated in various ways prior to provision to the imaging device. For instance, the package can be encrypted such that the package cannot be "opened" with another computing device but instead only used to generate hardcopies. At this point, the job package is provided to the imaging device, as indicated in block 526.

Various different methods can be used to provide the job package to the imaging device. By way of example, the package can be transmitted directly to the device as a print job, or transmitted as an attachment in an email message. In another example, the job packager 218 can connect with an embedded server of the imaging device and provide a non-local reference to the job package. In a further example, providing the job package can comprise transmitting a universal resource locator (URL) or file transfer protocol (FTP) address to the imaging device so that the package can be accessed by the device using a network client. Details as to these methods and others are described in detail in commonly assigned U.S. patent application Ser. No. 10/245,886, filed Sep. 16, 2002, which is hereby incorporated by reference in its entirety into the present disclosure.

Figure 6:
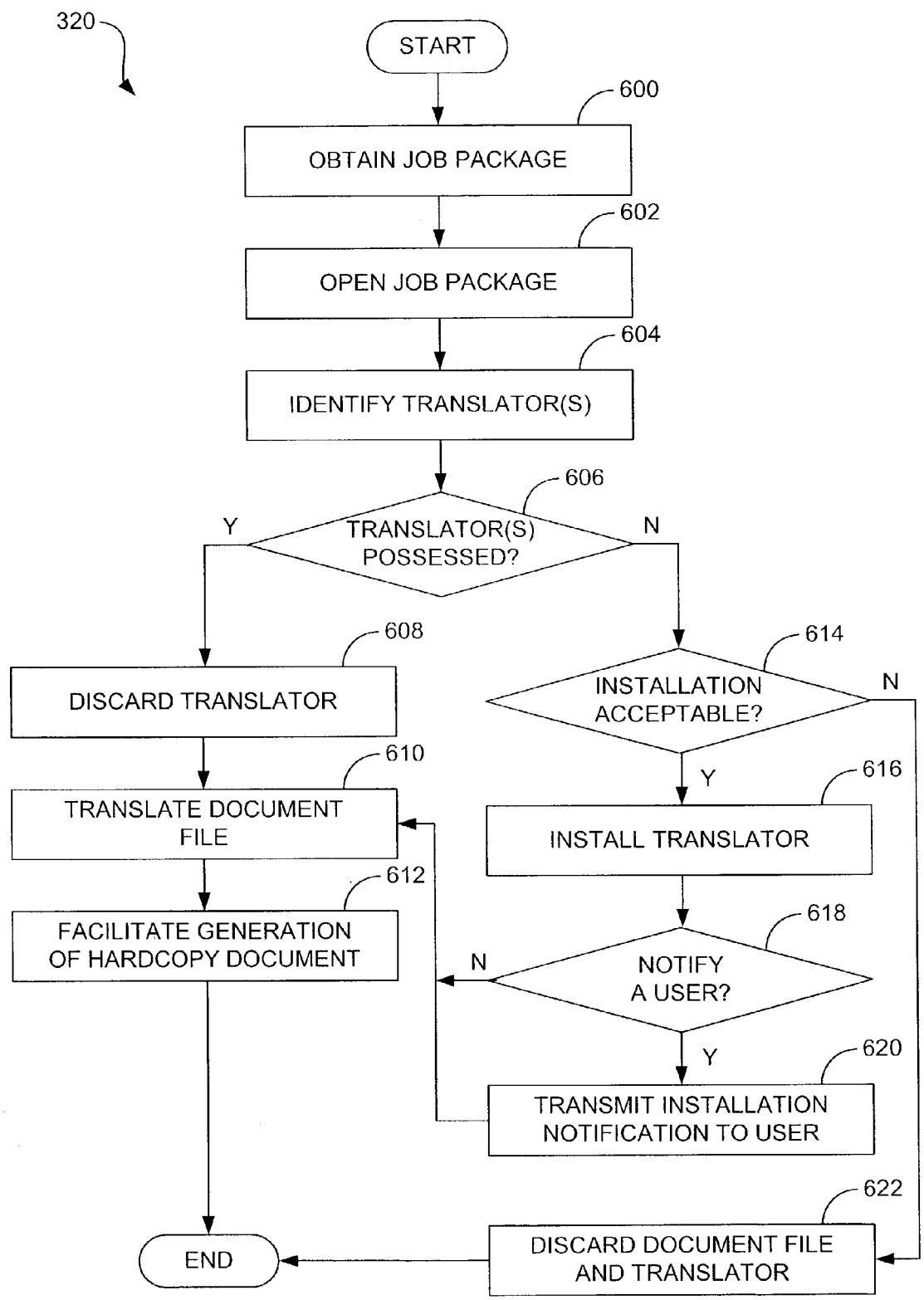
FIG. 6 is a flow diagram that provides an example of operation of a translator control module shown in FIG. 3.

FIG. 6 illustrates an example of operation of the translator control module 320 of the imaging device. Beginning with block 600, the job package is obtained. For instance, the package can have been received from a sending device such as a user computing device. Alternatively, the job package can have been retrieved using an address provided by the computing device. In any case, the job package is opened, as indicated in block 602, and the translator contained therein identified, as indicated in block 604. At this point, with reference to decision block 606, the translator control module 320 can determine whether the translator is already possessed. In particular, the module 320 can determine whether that particular translator, i.e., the identical translator in type and version, is already installed on the imaging device. If the translator is already possessed, flow continues to decision block 608 at which the translator is discarded as unnecessary. In such a case, the same translator has already been installed and may be used to translate the document file, as indicated in block 610. By way of example, the translator can be used to translate the document into a page description language (PDL) file, a printer control language (PCL) file, an image file (e.g., JPEG, TIFF, etc.), or any other "print ready" format. At this point, the translator control module 320 can facilitate generation of a hardcopy document, as indicated in block 612.

With reference back to decision block 606, if the translator is not already possessed, flow continues to decision block 614 at which it is determined whether installation is acceptable. This determination may be made in view of several conditions. For example, if the imaging device has been configured so as not to install any obtained translators, for instance in a set-up procedure by an authorized user (e.g., system administrator), installation is prohibited and the document file will not be printed. In such a case, the document file, as well as the translator, may be discarded, as indicated in block 622. Alternatively, one or both of the file and translator may be stored in memory for later use. In any case, the provider of the document file may be notified that the file will not be printed (not shown). In another alternative, installation may be deemed un-acceptable if there is insufficient storage space on the device to install it.

If installation is acceptable, however, flow continues to block 616, and the translator is installed on the imaging device. Due to this installation, the translator will be available to translate the document file, as well as other files of the same type that are later provided to the imaging device. Next, it can be determined whether to notify a user that the translator has been installed, as indicated in decision block 618. Such notification can be useful to a network administrator or other user that wishes to be apprised of what programs are installed on the imaging device. Again, this determination can be made in view of a configuration setting that has been selected by the user.

If no such notification is required, flow continues to block 610 described above, and the document file is translated using the installed translator. If notification is to be provided, flow continues to block 620, and an installation notification is transmitted to the pertinent user. Through this notification, the user is apprised of the installation of the translator and can, optionally, take the opportunity to install it on other imaging devices, if desired. At this point, flow continues to block 610, the file is translated, and a hardcopy document generated.

What is claimed is:

1. A method for installing a print driver, the method comprising:

forming a job package by packaging on a user computing device a document file in a native format of a user application in which it was created together with a print driver for use in translating the document file into a print ready format;

transmitting the job package from the user computing device to a printing device;

opening the job package on the printing device;

identifying the print driver on the printing device; and installing the print driver in memory of the printing device.

2. A method for facilitating installation of a print driver, the method comprising:

receiving selection of a document file in a native format of a user application in which it was created on a user computing device;

receiving selection on the user computing device of a printing device with which the document file is to be printed;

determining on the user computing device which print driver is needed to translate the document file into a print ready format used by the printing device to print a hard copy document; and packaging the print driver with the document file in the native format to form a job package on the user computing device.

3. The method of claim 2, further comprising retrieving with the user computing device the needed print driver if it is not already possessed.

4. The method of claim 3, wherein retrieving comprises retrieving the print driver from a print driver source via a network with the user computing device.

5. The method of claim 2, further comprising querying the printing device with the user computing device as to whether the print driver will be installed on the printing device prior to packaging the print driver.

6. The method of claim 2, further comprising providing the job package to the printing device.

7. The method of claim 6, wherein providing comprises transmitting the job package from the user computing device to the printing device.

8. The method of claim 6, wherein providing comprises transmitting information as to the location of the job package from the user computing device to the printing device.

9. The method of claim 1, wherein the user application is a word processing application.

10. The method of claim 2, wherein the user application is a word processing application.

11. A method for installing a print driver on a printing device, the method comprising:
   obtaining a job package with the printing device, the job package comprising a document file in a native format of a user application in which it was created and a print driver that is configured to translate the document file into a print ready format used by the printing device;
   opening the job package on the printing device;
   identifying the print driver included in the job package on the printing device; and
   installing the print driver within printing device memory.

12. The method of claim 11, wherein obtaining comprises receiving the job package with the printing device.

13. The method of claim 11, wherein obtaining comprises receiving with the printing device information concerning the location of the job package and retrieving the job package using the information with the printing device.

14. The method of claim 11, further comprising translating the document file using the print driver on the printing device.

15. The method of claim 11, further comprising, prior to installing the print driver, determining with the printing device whether the print driver is to be installed.

16. The method of claim 11, further comprising notifying a user with the printing device that the print driver has been installed.

17. The method of claim 11, wherein the user application is a word processing application.

18. A job packager stored on a computer-readable medium of a user computing device, the packager comprising:
   logic provided on the user computing device configured to identify a document file in a native format of a user application in which it was created;
   logic provided on the user computing device configured to identify a printing device that is to be used to print the document file;
   logic provided on the user computing device configured to determine a print driver needed to translate the document file from the native format into a print ready format used by the printing device; and
   logic provided on the user computing device configured to package the determined print driver with the document file in the native format to generate a job package.

19. The packager of claim 18, further comprising logic provided on the user computing device configured to retrieve the determined print driver.

20. The packager of claim 18, further comprising logic provided on the user computing device configured to query the printing device as to whether print driver installation is acceptable.

21. The packager of claim 18, further comprising logic provided on the user computing device configured to facilitate transmission of the job package to the printing device.

22. The packager of claim 18, further comprising logic provided on the user computing device configured to facilitate transmission of information as to the location of the job package to the printing device.

23. A print driver control module stored on a computer-readable medium of a printing device, the module comprising:
   logic configured to open on the printing device a job package including a document file in a native format of a user application in which it was created and a print driver configured to translate the document file into a print ready format used by the printing device;
   logic configured to identify on the printing device the print driver included in the job package; and
   logic configured to install the print driver within memory of the printing device.

24. The module of claim 23, further comprising logic configured to retrieve the job package with the printing device prior to opening it.

25. The module of claim 23, further comprising logic configured to translate the document file on the printing device using the print driver.

26. The module of claim 23, further comprising logic configured to determine on the printing device whether the print driver is to be installed.

27. The module of claim 23, further comprising logic configured to notify a user with the printing device that the print driver has been installed.

28. A printing device, comprising:
   a print engine;
   a processing device; and
   memory including an operating system and a print driver control module, the print driver control module being configured to obtain a job package comprising a document file in a native format of a user application in which it was created and a print driver that is configured to translate the document file into a print ready format, to open the job package, to identify the print driver, and to install the print driver within memory of the printing device.

29. The device of claim 28, wherein the print driver control module is further configured to translate the document file using the print driver.

30. The device of claim 28, wherein the print driver control module is further configured to determine whether the print driver is to be installed.

* * * * *